US012528263B2

(12) United States Patent
Nisimura et al.

(10) Patent No.: US 12,528,263 B2
(45) Date of Patent: Jan. 20, 2026

(54) PRESS APPARATUS AND METHOD OF MANUFACTURING PRESS-FORMED PRODUCT

(71) Applicant: NIPPON STEEL CORPORATION, Tokyo (JP)

(72) Inventors: Ryuichi Nisimura, Tokyo (JP); Yoshiyuki Kashiwara, Tokyo (JP); Yoshiyuki Kaseda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 216 days.

(21) Appl. No.: 18/037,460

(22) PCT Filed: Nov. 26, 2021

(86) PCT No.: PCT/JP2021/043356

§ 371 (c)(1),
(2) Date: May 17, 2023

(87) PCT Pub. No.: WO2022/114113

PCT Pub. Date: Jun. 2, 2022

(65) Prior Publication Data

US 2023/0405957 A1 Dec. 21, 2023

(30) Foreign Application Priority Data

Nov. 27, 2020 (JP) ................................ 2020-197038

(51) Int. Cl.
*B21D 22/06* (2006.01)
*B21D 37/10* (2006.01)
(Continued)

(52) U.S. Cl.
CPC ............ *B30B 15/026* (2013.01); *B21D 22/06* (2013.01); *B21D 37/10* (2013.01); *B30B 15/062* (2013.01)

(58) Field of Classification Search
CPC ...... B30B 15/007; B21D 22/02; B21D 22/06; B21D 5/0272
See application file for complete search history.

(56) References Cited

U.S. PATENT DOCUMENTS 5,293,972 A * 3/1994 Krumholz ............ B21D 5/0272
188/371
2018/0221934 A1* 8/2018 Xu ......................... B21D 13/02

FOREIGN PATENT DOCUMENTS

JP 4305645 B2 7/2009
JP 2016-179486 A 10/2016

* cited by examiner

*Primary Examiner* — Debra M Sullivan
(74) *Attorney, Agent, or Firm* — Birch, Stewart, Kolasch & Birch, LLP

(57) ABSTRACT

A press apparatus 1 includes: a first die part 2 having a first working surface 2*a*; a second die part 3 having a second working surface 3*a*; a first support member 4 that supports the first die part 2; and a second support member 5 that supports the second die part 3. At least one of the first and second die parts 2 and 3 provides a clearance S1, S2 present in at least a portion of an overlap region R1, the overlap region being overlapped by the first and second working surfaces 2*a* and 3*a* as viewed in the press direction, the dimension of the clearance in the press direction in a no-load condition being non-uniform along two orthogonal directions as viewed in the press direction. The minimum dimension of the clearance Si within an inner region R1*u* in the no-load condition is smaller than the minimum dimension of the clearance S1 within an outer region R1*s* in the no-load condition, the inner region defined by, and located inward of, the middle line between the centroid G and edge of the overlap region R1.

14 Claims, 10 Drawing Sheets

(51) Int. Cl.
*B30B 15/02* (2006.01)
*B30B 15/06* (2006.01)

PRESS APPARATUS AND METHOD OF MANUFACTURING PRESS-FORMED PRODUCT

TECHNICAL FIELD

The present invention relates to a press apparatus and a method of manufacturing a press-formed product.

BACKGROUND ART

In a press, an object to be pressed is typically positioned between a pair of die parts, which are then moved closer to each other to press-form the object into a shape that reflects the shapes of the working surfaces of the die parts. The die parts are supported by their respective support members capable of moving relative to each other in the press direction. The pair of support members may be, for example, a slider and a bolster. During press-forming, a press load is applied to a die part by its support member. At this point, a reaction force from the die part to the support member may cause the support member to deflection. This deflection may affect the shape accuracy of the resulting press-formed product.

JP 2016-179486 A (Patent Document 1) proposes a press apparatus that reduces deflections of the die parts caused by reaction forces during press-forming. This press apparatus includes a member with a rigidity distribution, located between a die part and a support member. In a rigidity distribution member, the rigidity against a compression in the press direction has a predetermined distribution in a plane perpendicular to the press direction.

Japanese Patent No. 4305645 (Patent Document 2) discloses performing a simulation of plate forming to determine deflection distribution in a die part depending on its forming stroke.

PRIOR ART DOCUMENTS

Patent Documents

Patent Document 1: JP 2016-179486 A
Patent Document 2: Japanese Patent No. 4305645

SUMMARY OF THE INVENTION

Problems to be Solved by the Invention

The conventional press apparatus described above require preparation of a rigidity distribution member. It is not easy to provide different rigidities within a single member to obtain a desired rigidity distribution. Another approach is to change the structure of the support members of the press (e.g., slide and bolster) or their back-up structure so as to reduce deflections of the support members. This is a large-scale, high-cost approach, and its effects are often limited.

An object of the present disclosure is to provide a press apparatus and a method of manufacturing a press-formed product that use a simple construction to reduce the effects of a deflection of a support member for a die part on the press-forming process.

Means for Solving the Problems

A press apparatus according to an embodiment of the present invention is a press apparatus for press-forming an object being pressed. The press apparatus includes: a first die part having a first working surface contactable with one side of the object being pressed during press-forming; a second die part having a second working surface contactable with another side of the object being pressed during press-forming; a first support member adapted to support the first die part; and a second support member adapted to support the second die part and reciprocally movable relative to the first support member in a press direction. At least one of the first and second die parts provides a clearance present in at least a portion of an overlap region, the overlap region being overlapped by the first and second working surfaces as viewed in the press direction, a dimension of the clearance in the press direction in a no-load condition being non-uniform along two orthogonal directions as viewed in the press direction. A minimum dimension of the clearance in the press direction within an inner region in the no-load condition is smaller than a minimum dimension of the clearance in the press direction within an outer region in the no-load condition, the inner region defined by, and located inward of, a middle line formed by a set of middle points of line segments each connecting a centroid of the overlap region with a given position on an edge of the overlap region, the outer region defined by, and located outward of, the middle line.

Effects of the Invention

According to the present disclosure, a simple construction may be used to reduce the effects of a deflection of a support member for a die part of a press on the press-forming process.

Figure 1:
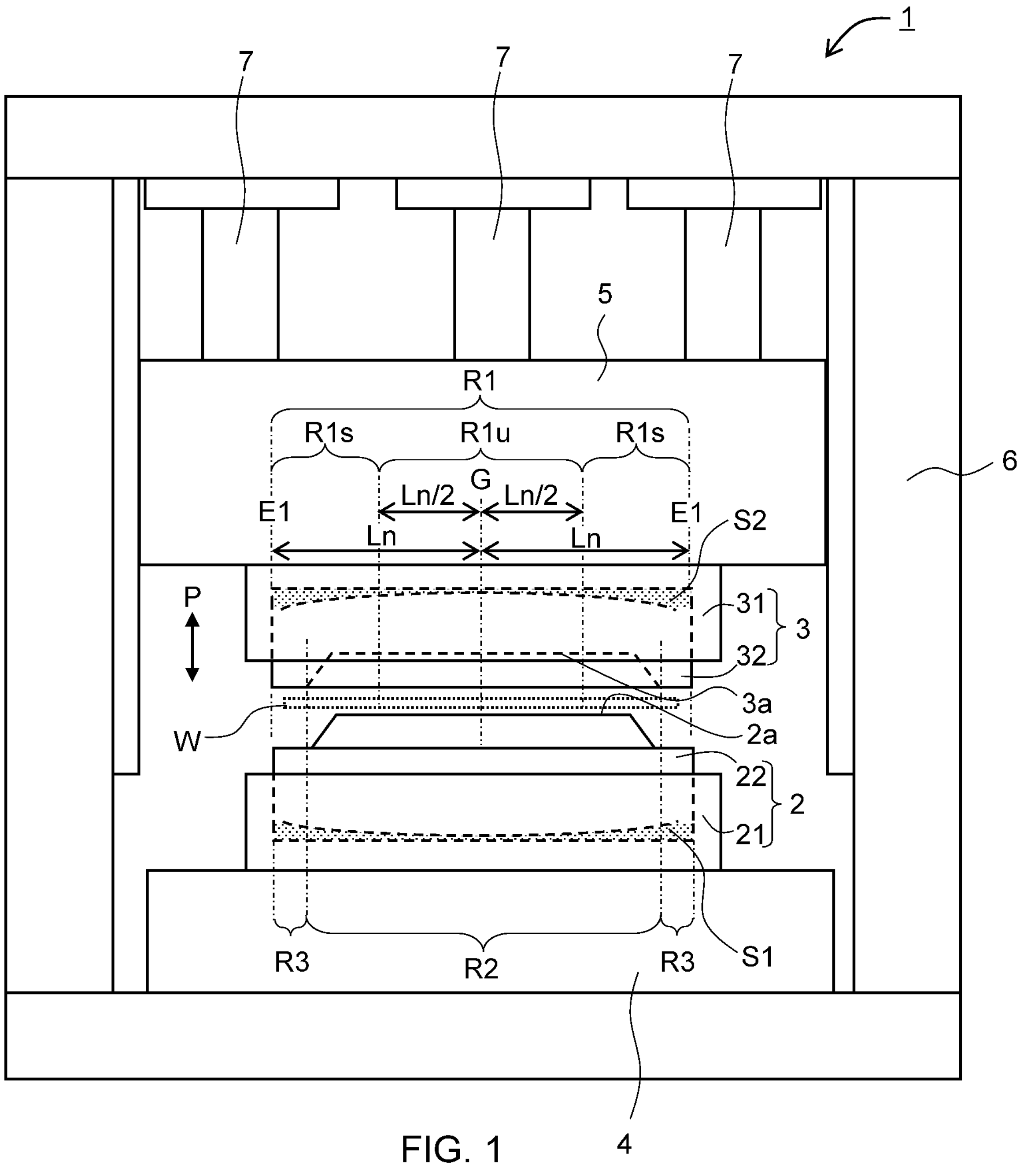
FIG. 1 shows an exemplary configuration of a press apparatus according to an embodiment.

EMBODIMENTS FOR CARRYING OUT THE INVENTION (Arrangement 1)

A press apparatus according to an embodiment of the present invention is a press apparatus for press-forming an object being pressed. The press apparatus includes: a first die part having a first working surface contactable with one side of the object being pressed during press-forming; a second die part having a second working surface contactable with another side of the object being pressed during press-forming; a first support member adapted to support the first die part; and a second support member adapted to support the second die part and reciprocally movable relative to the first support member in a press direction. At least one of the first and second die parts provides a clearance present in at least a portion of an overlap region, the overlap region overlapping the first and second working surfaces as viewed in the press direction, a dimension of the clearance in the press direction in a no-load condition being non-uniform.

During press-forming by the press apparatus, an object to be pressed is positioned between the first working surface of the first die part and the second working surface of the second die part. The first and second working surfaces (hereinafter sometimes simply referred to as "working surface(s)"), have shapes that depend on the target shape of the press-formed product. Relative movement in the press direction between the first and second support members so that they are closer to each other achieves press-forming of the object being pressed between the first and second die parts. During press-forming, the first working surface is in contact with one side of the object being pressed, while the second working surface is in contact with the other side of the object being pressed, i.e., the side of the object opposite to that one side. The shape of the press-formed product is determined by the shape of the space (i.e., clearance) between the first and second working surfaces as found when the first and second die parts are located closest to each other, i.e., when the die is at the bottom-dead center. The combined shape of the working surfaces need not be identical with the target shape of the press-formed product. For example, the amount of elastic deformation after pressing, such as spring-back (i.e., elastic recovery), may be taken into consideration to design the combined shape of the working surfaces so that it is different from the target shape of the press-formed product.

In Arrangement 1 above, in the no-load condition, at least one of the first and second die parts (hereinafter sometimes simply referred to as "die part(s)") of the press apparatus provides a clearance present in an overlap region, the overlap region overlapping the working surfaces as viewed in the press direction, the dimension of the clearance in the press direction being non-uniform. During press-forming, at least one of the first and second support members (hereinafter sometimes simply referred to as "support member(s)"), may be deflectioned by a press load. A deflection of a support member causes the associated die part to deform. The inventors discovered that a clearance provided by a die part that is non-uniform in the no-load condition, as discussed above, would absorb any deformation of the die part caused by a deflection of the associated support member during press-forming. Thus, providing a die part with a clearance that is non-uniform in the no-load condition, as discussed above, will reduce deformation of the die part caused by a deflection of the support member during press-forming. As a result, deformation of the working surface of the die part caused by a deflection of the support member will also be reduced. In this manner, a simple configuration may be used to reduce the effects of a deflection of a support member for a die part on the press-forming process. Examples of effects on the press-forming process include defects in forming such as cracks, wrinkles, or decreases in the shape accuracy of the press-formed product.

As used herein, "in the no-load condition" means that no press load is being applied to a die part. Further, the clearance provided by at least one of the first and second die parts may be a clearance between the first die part and first support member, or a clearance between the second die part and second support member, or may be a clearance inside the first or second die part. The clearance inside the first or second die part may be a clearance between members constituting part of the first or second die part, for example. Thus, the clearance may be a clearance between two adjacent members, e.g., between the die parts or between a die part and a member in contact with the die part. That is, the clearance is provided between a surface of one of two adjacent members and a surface of the other member that faces that surface. The two adjacent members may both be components of a die part, or one of them may be a component of a support member in contact with the die part. By way of example, the clearance in the no-load condition may be a clearance between a protruding surface of one of two adjacent members that protrudes in the press direction and a flat surface of the other member that faces that protruding surface.

In Arrangement 1 above, at least one of the first and second die parts may provide a clearance present in at least a portion of an overlap region, the overlap region being overlapped by the first and second working surfaces as viewed in the press direction, a dimension of the clearance in the press direction in the no-load condition being non-uniform along two orthogonal directions as viewed in the press direction. In such implementations, a minimum dimension of the clearance in the press direction within an inner region in the no-load condition may be smaller than a minimum dimension of the clearance in the press direction within an outer region in the no-load condition, the inner region defined by, and located inward of, a middle line formed by a set of middle points of line segments each connecting a centroid of the overlap region with a given position on an edge of the overlap region, the outer region defined by, and located outward of, the middle line. Thus, a simple configuration may be used to reduce the effects of a deflection of a support member for a die part on the press-forming process. For example, when each of the first and second support members is deflectioned so as to be recessed in the press direction to have the shape of a bowl, where the first and second die parts represent the respective centers, then, this deflection can be efficiently absorbed by the clearances.

The edge of the overlap region as viewed in the press direction is represented by a closed line (i.e., annular). Thus, the middle line, which is formed by a set of the middle points of lines each connecting the centroid with a given point on the edge, is represented by a closed line (i.e., annular). The minimum dimension of the clearance in the press direction in each of the inner and outer regions is defined as the dimension of the clearance in the press direction as measured at the point in the relevant one of the inner and outer regions at which the dimension of the clearance in the press direction is smallest.

A minimum dimension of the clearance in the press direction within an inner region in the no-load condition may be smaller than a minimum dimension of the clearance in the press direction within an outer region in the no-load condition as examined along two orthogonal directions as viewed in the press direction. This allows bowl-shaped deflections, with the centers represented by the first and second die parts, to be more efficiently absorbed by the clearances. For example, the minimum dimension of the clearance within the inner region in the no-load condition may be smaller than the minimum dimension of the clearance within the outer region in the no-load condition as examined along both the length and width directions of the overlap region.

(Arrangement 2)

Starting from Arrangement 1 above, an amount of deformation of the clearance in the press direction when the die parts are at the bottom-dead center relative to the clearance in the overlap region in the no-load condition may be larger than an amount of deformation of the first and second working surfaces in the press direction when the die parts are at the bottom-dead center relative to the first and second working surfaces in the no-load condition. Thus, a simple configuration may be used to reduce the effects of a deflection of a support members for a die part on the press-forming process.

For example, clearances in the no-load condition may be configured such that the shapes of the first and second working surfaces in the no-load condition are identical with the shapes of the first and second working surfaces when the die parts are at the bottom-dead center. Implementations in which the shapes of the first and second working surfaces in the no-load condition are identical with the shapes of the first and second working surfaces when the die parts are at the bottom-dead center include implementations in which the shapes have changed so slightly that their effects on the shape accuracy of the press-formed product are negligible.

(Arrangement 3)

A minimum dimension of the clearance in the press direction in a forming-surface region may be smaller than a minimum dimension of the clearance in the press direction in a peripheral region, the forming-surface region being a portion of the overlap region in which the first and second working surfaces contribute to displacement of the object being pressed in the press direction during press-forming, the peripheral region defined by, and located outward of, the forming-surface region. This will efficiently reduce the effects of a deflection of a support member for a die part in a region having the center represented by the forming surface of the die part on the press-forming process.

(Arrangement 4)

Starting from any one of Arrangements 1 to 3 above, at least one of the first and second die parts may include a portion configured such that the dimension of the clearance in the press direction in the no-load condition is smaller in an interior of the region than at the edge of the region as viewed in the press direction.

The inventors discovered that, if the clearance in the interior of the region overlapping the first and second working surfaces as viewed in the press direction is smaller than the clearance at the edge of the region, deformation of the associated die part due to a deflection of the associated support member can be absorbed by the clearance more easily. If the clearance in the interior of the region overlapping the working surfaces is smaller than the clearance at the edge as in Arrangement 4 above, deformation of the die part due to a deflection of the support member can be further reduced.

(Arrangement 5)

Starting from any one of Arrangements 1 to 4 above, the clearance may be provided by at least one of a recess/protrusion of a surface of the first die part facing the first support member or a recess/protrusion of a surface of the second die part facing the second support member. Thus, a clearance for absorbing deformation of the associated die part caused by a deflection of the associated support member may be provided at a position in the die part close to the support member.

(Arrangement 6)

Starting from Arrangement 5 above, at least one of the recess/protrusion of the surface of the first die part facing the first support member or the recess/protrusion of the surface of the second die part facing the second support member may include a portion configured such that an amount of protrusion in the press direction in the no-load condition is larger in an interior of the overlap region as viewed in the press direction than at the edge of the overlap region. This will further reduce deformation of a die part due to a deflection of the associated support member.

For example, at least one of the surface of the first die part facing the first support member or the surface of the second die part facing the second support member may include an inclined surface shaped such that the amount of protrusion in the no-load condition increases as going from the edge toward interior of the overlap region as viewed in the press direction.

(Arrangement 7)

Starting from any one of Arrangements 1 to 6 above, the clearance may be provided by at least one of an insert plate inserted between the first die part and the first support member or an insert plate inserted between the second die part and the second support member. Thus, a clearance for absorbing deformation of the associated die part caused by a deflection of the associated support member may be provided at a position in the die part close to the support member. Further, the geometry of the clearance can easily be changed by replacing the insert plate. The insert plate may be, for example, an insert plate with non-uniform thicknesses.

(Arrangement 8)

Starting from Arrangement 7 above, the at least one of the insert plate inserted between the first die part and the first support member or the insert plate inserted between the second die part and the second support member may include a portion configured such that a thickness in the no-load condition is larger in an interior of the overlap region as viewed in the press direction than at the edge of the overlap region. This will further reduce deformation of a die part due to a deflection of the associated support member.

For example, at least one of the insert plate inserted between the first die part and the first support member or the insert plate inserted between the second die part and the second support member may include a portion configured such that the thickness in the no-load condition increases going from the edge toward interior of the overlap region as viewed in the press direction. For example, the insert plate may include an inclined surface inclined such that the thickness increases going from the edge toward interior of the overlap region.

(Arrangement 9)

Starting from any one of Arrangements 1 to 8 above, at least one of the first and second die parts may include a working-surface part including the first or second working surface and a base adapted to allow the working-surface part to be mounted thereon. In such implementations, the clearance may be provided between the working-surface part and the base of the at least one of the first or second die part. Further, the clearance may be provided by a recess/protrusion of a surface of the working-surface part facing the base or a surface of the base facing the working-surface part. Thus, a clearance for absorbing deformation of the associated die part due to a deflection of the associated support member may be provided at a position in the die part close to the working surface. This will facilitate reducing deformation of a working surface that affects the shape accuracy of the press-formed product.

(Arrangement 10)

Starting from Arrangement 9 above, the recess/protrusion of the surface of the working-surface part facing the base or the surface of the base facing the working-surface part may include a portion configured such that an amount of protrusion in the press direction in the no-load condition is larger in an interior of the overlap region as viewed in the press direction than at the edge of the overlap region. This will further reduce deformation of a die part due to a deflection of the associated support member.

For example, the surface of the working-surface part facing the base or the surface of the base facing the working-surface part may include, in the no-load condition, an inclined surface shaped such that the amount of protrusion increases going from the edge toward interior of the overlap region as viewed in the press direction.

(Arrangement 11)

Starting from any one of Arrangements 1 to 10 above, at least one of the first and second die parts may include a working-surface part including the first or second working surface and a base adapted to allow the working-surface part to be mounted thereon. The clearance may be provided by an insert plate inserted between the working-surface part and the base of at least one of the first or second die part. Thus, a clearance for absorbing deformation of the associated die part caused by a deflection of the associated support member may be provided at a position in the die part close to the support member. Further, the geometry of the clearance can easily be changed by replacing the insert plate. The insert plate may be, for example, an insert plate with non-uniform thicknesses.

(Arrangement 12)

Starting from Arrangement 11 above, the insert plate inserted between the working-surface part and the base may include a portion configured such that a thickness in the no-load condition is larger in an interior of the overlap region as viewed in the press direction than at the edge of the overlap region. This will further reduce deformation of a die part due to a deflection of the associated support member.

For example, the insert plate inserted between the working-surface part and base may include a portion configured such that the thickness in the no-load condition increases going from the edge toward interior of the overlap region as viewed in the press direction. For example, the insert plate may include an inclined surface inclined such that the thickness increases going from the edge toward interior of the overlap region.

(Manufacturing Method)

A method of manufacturing a press-formed product using a press apparatus is included in the embodiments of the present invention. A manufacturing method according to an embodiment of the present invention includes: placing an object to be pressed between a first die part supported by a first support member of the press apparatus and a second die part supported by a second support member; and performing press-forming by effecting such relative movement in a press direction between the first support member and the second support member that the support members are closer to each other so that a first working surface of the first die part contacts one side of the object to be pressed and a second working surface of the second die part contacts another side of the object to be pressed. At least one of the first and second die parts provides a clearance present in at least a portion of an overlap region, the overlap region being overlapped by the first and second working surfaces as viewed in the press direction, a dimension of the clearance in the press direction in a no-load condition being non-uniform along two orthogonal directions as viewed in the press direction. During the press-forming, the dimension of the clearance in the press direction in at least a portion of the region is closer to uniform than in the no-load condition. This manufacturing method may be performed using the press apparatus of any one of Arrangements 1 to 12 above.

In the manufacturing method above, a non-uniform clearance provided for a die part in the no-load condition as described above will absorb deformation of the die part due to a deflection of the associated support member during press-forming. As a result, deformation of the working surface of the die part caused by a deflection of the support member will also be reduced. In this manner, a simple configuration may be used to reduce the effects of a deflection of a support member for a die part on the press-forming process.

In the no-load condition, a minimum dimension of the clearance in the press direction within an inner region may be smaller than a minimum dimension of the clearance in the press direction within an outer region as examined along both length and width directions of the overlap region as viewed in the press direction, the inner region defined by, and located inward of, a middle between a centroid of the overlap region and an edge of the overlap region, the outer region defined by, and located outward of, the middle between the centroid and the edge.

An amount of change in a dimension of the clearance in the press direction in the forming-surface region when the die parts are at the bottom-dead center relative to a dimension of the clearance in the press direction in the forming-surface region in the no-load condition may be larger than an amount of change in shapes of the first and second working surfaces when the die parts are at the bottom-dead center relative to the shapes in the no-load condition.

Now, embodiments of the present invention will be described in detail with reference to the drawings. The same or corresponding components in the drawings are labeled with the same reference numerals, and their description will not be repeated. For ease of explanation, the drawings to which reference will be made below show elements in a simplified or schematic manner, and/or do not show some elements.

EMBODIMENTS

FIG. 1 is a side view of a press apparatus according to an embodiment, showing an exemplary configuration thereof. The press apparatus 1 shown in FIG. 1 includes a first die part 2, a second die part 3, a first support member 4, a second support member 5, a frame 6 and slide drive units 7.

The first support member 4 may be a bolster, for example. The first support member 4 supports the first die part 2. That is, the first die part 2 is mounted on the first support member 4 and fixed thereto. The first die part 2 includes a first working surface 2*a*. During press-forming, the first working surface 2*a* contacts one side of an object to be pressed, W. The shape of the first working surface 2*a* may be identical with the corresponding portion of the target shape of the resulting press-formed product. Alternatively, the shape of the first working surface 2*a* may be the corresponding portion of the target shape of the press-formed product minus the amount of elastic deformation during press-forming, such as spring-back (i.e., elastic recovery).

The second support member 5 may be a slide (or ram), for example. The second support member 5 supports the second die part 3. That is, the second die part 3 is mounted on the second support member 5 and fixed thereto. The second die part 3 includes a second working surface 3*a*. During press-forming, the second working surface 3*a* contacts the other side of the object to be pressed W (i.e., side opposite to said one side). The shape of the second working surface 3*a* may be identical with the corresponding portion of the target shape of the resulting press-formed product. Alternatively, the shape of the second working surface 3*a* may be the corresponding portion of the target shape of the press-formed product minus the amount of elastic deformation during press-forming, such as spring-back (i.e., elastic recovery).

The second support member 5 is capable of reciprocating relative to the first support member 4 in the press direction. In the implementation shown in FIG. 1, the first support member 4 is fixed to the frame 6. The second support member 5 is mounted so as to be able to reciprocate relative to the frame 6 in the press direction. In FIG. 1, the press direction is indicated by arrow P. The slide drive units 7 cause the second support member 5 to reciprocate relative to the frame 6 in the press direction. The slide drive units 7 may be driven in a mechanical or hydraulic manner, for example. Mechanical driving may be implemented by, for example, a crank mechanism, a knuckle mechanism, or a link mechanism. Each hydraulic slide drive unit 7 may be, for example, a unit including an oil-hydraulic cylinder. Further, the slide drive units may be driven and controlled by a servo motor, regardless of whether a mechanical or hydraulic mechanism is used.

In the implementation shown in FIG. 1, the frame 6 includes a bed that allows the first support member 4 (i.e., bolster) to be placed thereon, columns extending upward from the bed, and a crown positioned on the columns to bridge them. The slide drive units 7 are positioned between the crown and second support member 5.

FIG. 1 shows the press apparatus 1 in a no-load condition. In the no-load condition, the first die part 2 provides a clearance S1, while the second die part 3 provides a clearance S2. The dimensions of the clearances S1 and S2 as measured in the press direction in the no-load condition are non-uniform in at least a portion of an overlap region R1, which overlaps the first and second working surfaces 2*a* and 3*a* as viewed in the press direction.

Each of the clearances S1 and S2 may be a space between a protruding surface of a component of the press apparatus that protrudes in the press direction or a recessed surface of a component recessed in the press direction, on one hand, and a surface of a component of the press apparatus that faces (i.e., is opposite to) that surface and is perpendicular to the press direction.

In the implementation shown in FIG. 1, each of the press-direction dimensions of the clearances S1 and S2 as measured at the center of the overlap region R1 is smaller than the press-direction dimension of the clearance S1, S2 as measured at the edge of the overlap region R1. Each of the press-direction dimensions of the clearances S1 and S2 gradually decreases as it goes from the edge toward interior of the overlap region R1. In other words, each of the press-direction dimensions of the clearances S1 and S2 is smallest at the center of the overlap region R1, and increases as it goes from the center toward edge of the overlap region R1. Thus, each of the clearances S1 and S2 preferably includes a portion where it decreases going from the edge toward interior of the overlap region R1. This will facilitate absorption, by the clearances S1 and S2, of deformation of the first and second die parts 2 and 3 caused by deflections of the first and second support members 4 and 5 during press-forming.

FIG. 1 is a side view of the apparatus as viewed in a direction perpendicular to the length direction of the overlap region. FIG. 1 shows the shapes of the clearances S1 and S2 as extending in the length direction. In the implementation shown in FIG. 1, the minimum press-direction dimension of each of the clearances S1 and S2 as measured in an inner region R1*u*, which is defined by, and located inward of, the middle between the centroid G and edge μl of the overlap region R1 as examined along the length direction of the overlap region R1, is smaller than the minimum press-direction dimension of the clearance S1, S2 as measured in an outer region R1*s*, which is defined by, and located outward of, the middle between the centroid G and edge μl. Further, although not shown, the minimum dimension of each of the clearances S1 and S2 in the inner region R1*u* as examined along the width direction of the overlap region R1 is smaller than the minimum dimension in the outer region R1*s*. This configuration of the clearances S1 and S2 in the no-load condition enables the clearances S1 and S2 to efficiently absorb deflections in the press apparatus 1, thereby reducing deformation of the first and second working surfaces 2*a* and 3*a* when the die is at the bottom-dead center. It will be understood that the length and width directions represent an example of a set of two orthogonal directions as viewed in the press direction.

Further, in the implementation shown in FIG. 1, the minimum press-direction dimension of each of the clearances S1 and S2 in a forming-surface region R2 is smaller than the minimum press-direction dimension of the clearance S1, S2 in a peripheral region R3, which is defined by, and located outward of, the forming-surface region R2. The forming-surface region R2 is a portion of the overlap region R1 in which the first and second working surfaces 2*a* and 3*a* contribute to displacement of the object being pressed in the press direction during press-forming. The forming-surface region R2 is included in the overlap region R1 as viewed in the press direction. In the forming-surface region R2, when the die is at the bottom-dead center, the object being pressed is displaced in the press direction in conformity with the shapes of the first and second working surfaces 2*a* and 3*a*. This configuration of the clearances S1 and S2 in the no-load condition will allow the clearances S1 and S2 to efficiently absorb deflections in the press apparatus 1, thereby reducing deformation of the first and second working surfaces 2*a* and 3*a* when the die is at the bottom-dead center.

If a press-formed product is to be produced using the press apparatus 1, first, an object to be pressed is placed between the first and second die parts 2 and 3. Thereafter, the slide drive units 7 move the second support member 5 closer to the first support member 4. The second support member 5 moves until the second die part 3 reaches the bottom-dead center. When the die part is at the bottom-dead center, the first working surface 2*a* of the first die part 2 is in contact with one side of the object to be pressed, W, while the second working surface 3*a* of the second die part 3 is in contact with the other surface of the object to be pressed W.

Figure 2:
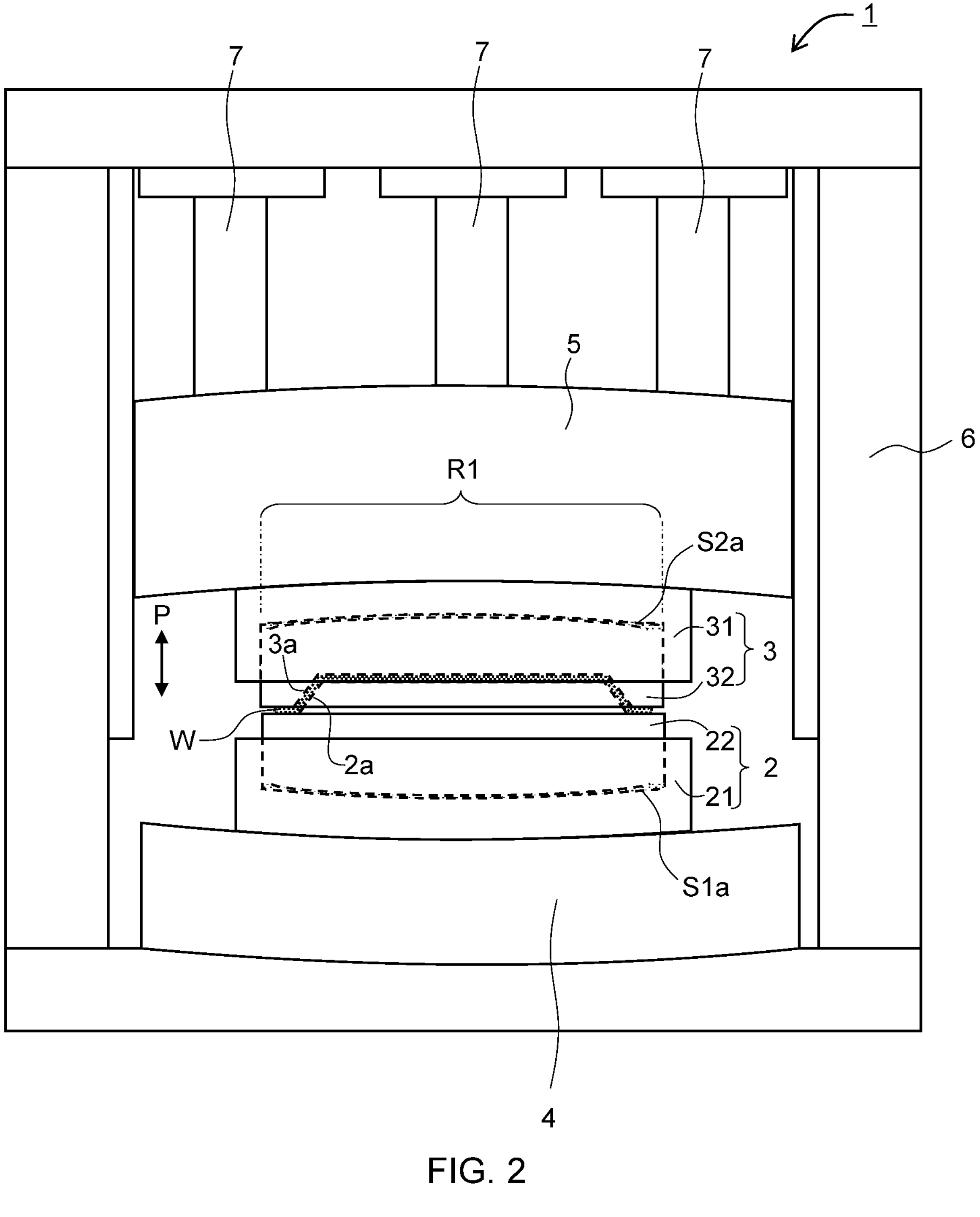
FIG. 2 shows the press apparatus shown in FIG. 1 as found when the second die part is at the bottom-dead center.

FIG. 2 shows the press apparatus 1 shown in FIG. 1 as found when the second die part 3 is at the bottom-dead center. When the die is at the bottom-dead center, a press load is applied to the first and second die parts 2 and 3 by the first and second support members 4 and 5. A reaction force from each of the first and second die parts 2 and 3 acts on the respective one of the first and second support members 4 and 5. The first and second support members 4 and 5 are deflectioned by these reaction forces. The deflectioned support members cause the first and second die parts 2 and 3 to deform, as well.

In the implementation shown in FIG. 2, the first and second die parts 2 and 3, when at the bottom-dead center, have deformed so as to fill the clearances S1 and S2, respectively, as were present in the no-load condition. The clearances S1*a* and S2*a* as found when the die is at the bottom-dead center are narrower than the clearances S1 and S2 as were present in the no-load condition. Each of the press-direction dimensions of the clearances S1 and S2 in the no-load condition changes, during press-forming, so as to be closer to uniform than the dimension in the no-load condition. That is, the clearances S1 and S2 in the no-load condition deform so as to absorb deformation of the first and second die parts 2 and 3, respectively, during press-forming. This will reduce deformation of the first working surface 2*a* of the first die part 2 and the second working surface 3*a* of the second die part 3 caused by deflections of the first and second support members 4 and 5 during press-forming.

In the implementation shown in FIGS. 1 and 2, the amounts of deformation of the clearances S1 and S2 in the press direction in the overlap region R1 as found when the die is at the bottom-dead center relative to the clearances S1 and S2 in the no-load condition are larger than the amounts of deformation of the first and second working surfaces 2*a* and 3*a* in the press direction as found when the die is at the bottom-dead center relative to the first and second working surfaces 2*a* and 3*a* in the no-load condition. Thus, the clearances S1 and S2 in the no-load condition are configured such that the shapes of the first and second working surfaces 2*a* and 3*a* when the die is at the bottom-dead center are generally identical with the first and second working surfaces 2*a* and 3*a* in the no-load condition.

When a press load causes the first and second support members 4 and 5 to deflection, the first and second die parts 2 and 3, which are connected to those members, also experience deflectioning. As a result, the first working surface 2*a* of the first die part 2 and the second working surface 3*a* of the second die part 3 can also experience deformation caused by that deflection. The shape of the space between the first and second working surfaces 2*a* and 3*a* as found when the die is at the bottom-dead center (i.e., clearance) determines the shape of the resulting press-formed product. As such, deformation of the first and second working surfaces 2*a* and 3*a* is a factor responsible for decreased forming qualities, e.g., cracks or wrinkles in the press-formed product, or decreased shape accuracy of the press-formed product.

In the implementation discussed above, the clearances S1 and S2 for the first and second die parts 2 and 3 in the no-load condition work to absorb deflections of the first and second support members 4 and 5 of the press apparatus 1 during press-forming. This will enable reducing the amount of deformation of the working surfaces, which provide contacts of the die parts with the object. As a result, the shape accuracy of the press-formed product will be improved.

In the implementation shown in FIG. 1, the clearance S1 is located inside the first die part 2, while the clearance S2 is located inside the second die part 3. As will be described in detail further below, in a variation, a clearance S1 may be provided at a position between the first die part 2 and the first support member 4. A clearance S2 may be provided at a position between the second die part 3 and the second support member 5. Further, clearances S1 and S2 may be formed by providing recesses/protrusions on surfaces of the first and second die parts 2 and 3. Alternatively, clearances S1 and S2 may be formed by insert plates inserted into the first and second die parts 2 and 3.

In the implementation shown in FIG. 1, the first die part 2 includes a base 21 and a working-surface part 22. The working-surface part 22 includes the first working surface 2*a*. The working-surface part 22 is mounted on the base 21. The base 21 is mounted on the first support member 4. The second die part 3 includes a base 31 and a working-surface part 32. The working-surface part 32 includes the second working surface 3*a*. The working-surface part 32 is mounted on the base 31. The base 31 is mounted on the second support member 5.

The working-surface parts 22 and 32 may be insert die parts, for example. The bases 21 and 31 may be insert receptacles, for example. An insert receptacle may include a recessed portion recessed in the press direction, for example. In such implementations, an insert die part is inserted into the recessed portion of an insert receptacle and fixed thereto. It will be understood that the insert receptacles are not limited to constructions that receive insert die parts at recessed portions.

In the implementation shown in FIG. 1, the clearance S1 is formed by a recess/protrusion on a surface of the working-surface part 22 of the first die part 2 that faces the base 21. The clearance S2 is formed by a recess/protrusion on a surface of the working-surface part 32 of the second die part 3 that faces the base 31. The recess/protrusion on each of the working surfaces 22 and 32 is shaped to protrude toward the associated one of the bases 21 and 31. Each of the surfaces of the bases 21 and 31 that face the respective working-surface parts 22 and 32 is a flat surface perpendicular to the press direction.

In a variation, clearances S1 and S2 may each be formed by a recess/protrusion on a surface of a base 21, 31 that faces the associated one of the working-surface parts 22 and 32. In such implementations, the recess/protrusion on each of the bases 21 and 31 may be a protruding surface protruding in the press direction. Further, in such implementations, each of the surfaces of the working-surface parts 22 and 32 that face the respective bases 21 and 31 is a flat surface perpendicular to the press direction.

Thus, the clearances S1 and S2 in the no-load condition may each be a clearance between a member having a protruding surface protruding in the press direction, on one hand, and a member having a flat surface facing that protruding surface. In such implementations, upon application of a press load, the protruding portion of the protruding surface, first of all portions thereof, contacts the opposite surface to receive the load. This facilitates absorption by the clearance of deflections caused by the press load.

Figure 3:
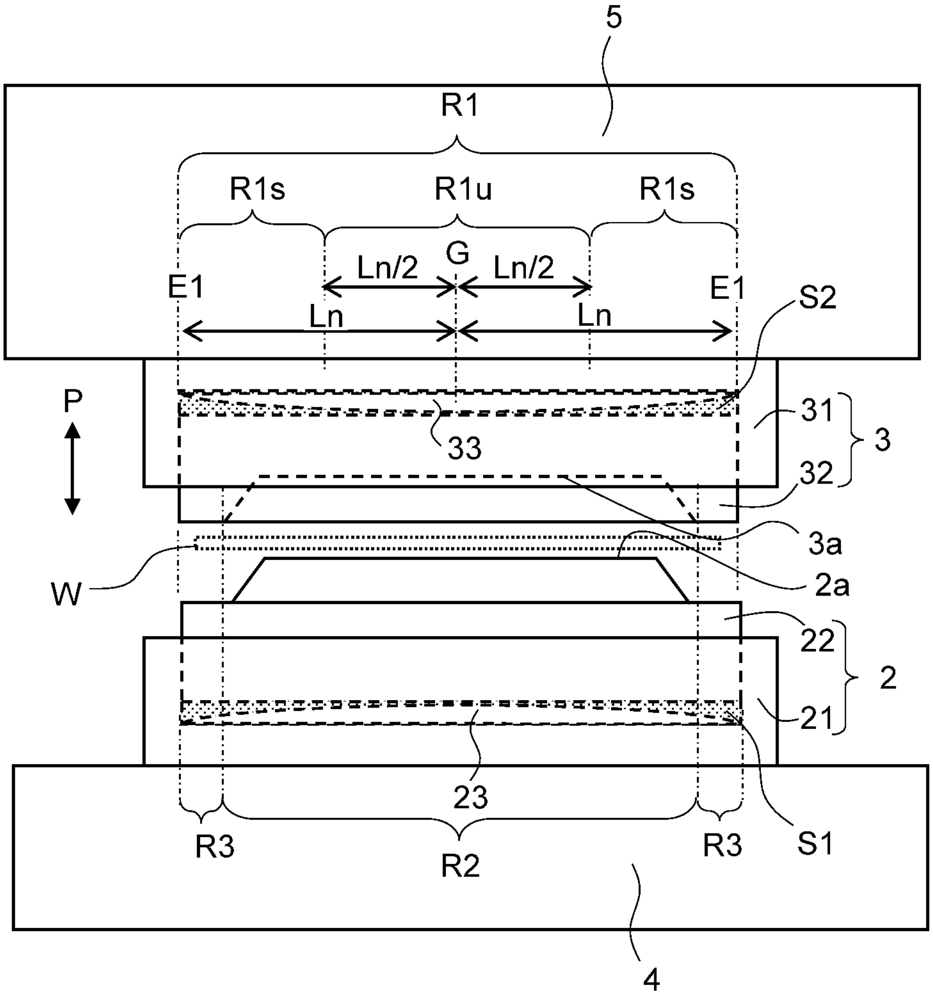
FIG. 3 shows a variation of the apparatus in terms of the configuration of the clearances for the die parts.

FIG. 3 shows a variation of the apparatus in terms of the configuration of the clearances S1 and S2 for the first and second die parts 2 and 3. In the implementation shown in FIG. 3, a clearance S1 is provided by an insert plate 23, having non-uniform thicknesses, that has been inserted between the working-surface part 22 and base 21 of the first die part 2. That is, the clearance S1 is formed by a space between the insert plate 23 and working-surface part 22 or base 21. A clearance S2 is provided by an insert plate 33, having non-uniform thicknesses, that has been inserted between the working-surface part 32 and base 31 of the second die part 3. That is, the clearance S2 is formed by a space between the insert plate 33 and the working-surface part 32 or base 31.

For each of the insert plates 23 and 33, the thickness is largest at the center and decreases as it goes from the center toward the periphery. Each of the insert plates 23 and 33 has the shape of a convex lens. For each of the insert plates 23 and 33, one side is a flat surface, while the other side, opposite to that one side, is a protruding curved surface. Thus, each of the insert plates 23 and 33 may include a portion in which the thickness at a position close to the edge of the overlap region R1 is smaller than the thickness at a position inside the overlap region R1 far from the edge. This will further reduce deformation of the first and second working surfaces 2*a* and 3*a* caused by deflections of the first and second support members 4 and 5. The insert plates 23 and 33 are positioned to protrude toward the first and second working surfaces 2*a* and 3*a*, respectively. Conversely, the insert plates 23 and 33 may be positioned to protrude away from the first and second working surfaces 2*a* and 3*a*, respectively.

Figure 4:
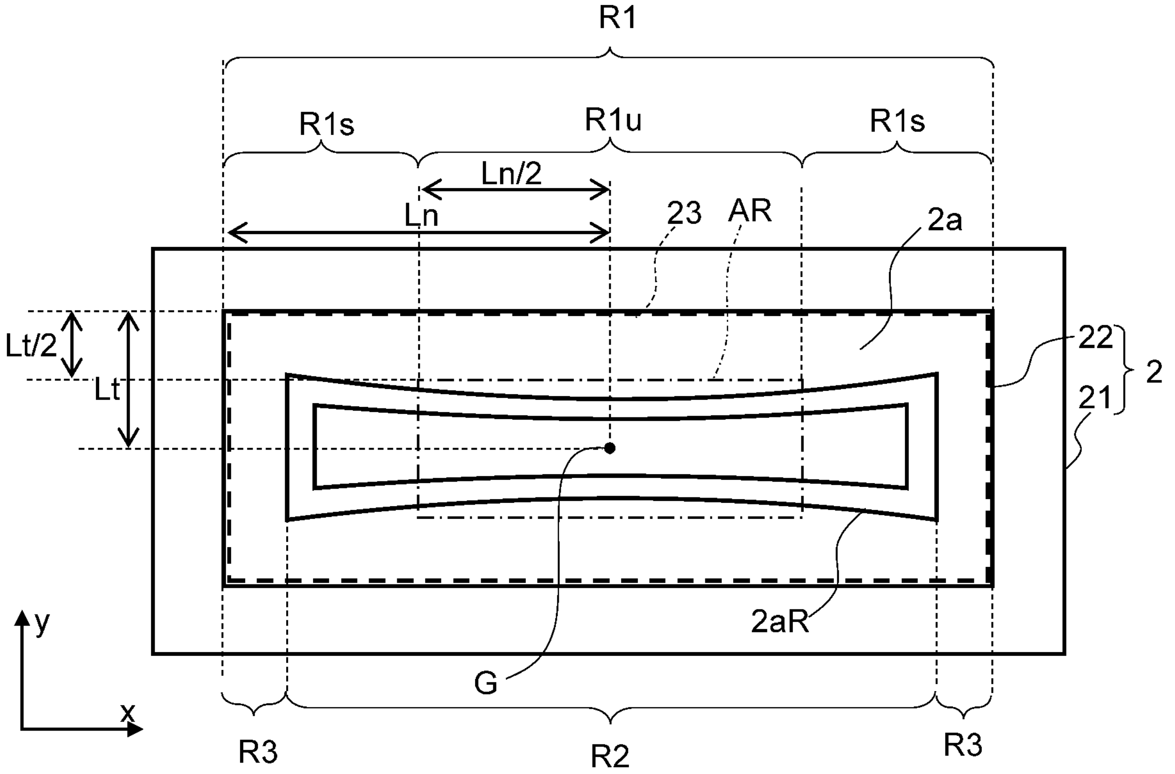
FIG. 4 is a plan view of the first die part shown in FIG. 3 as viewed in the press direction (i.e., from above).

FIG. 4 is a plan view of the first die part 2 shown in FIG. 3 as viewed in the press direction (i.e., from above). In FIG. 4, the insert plate 23 is indicated by a broken line. In the implementation shown in FIG. 4, the insert plate 23 is generally identical in shape with the first working surface 2*a* as viewed in the press direction. That is, as viewed in the press direction, the insert plate 23 is such that it overlaps the entire first working surface 2*a*. Alternatively, the insert plate 23 may be such that it overlaps at least a portion of the first working surface 2*a*. Alternatively, the insert plate 23 may be such that it encompasses the entire region overlapping the first working surface 2*a*. For example, as viewed in the press direction, the insert plate 23 may be present in an area that includes the first working surface 2*a* and is larger than the first working surface 2*a*. Similarly, as viewed in the press direction, the insert plate 33 may be such that it overlaps the entire second working surface 3*a*, or may be such that it overlaps at least a portion thereof.

The entire first working surface 2*a* overlaps the second working surface 3*a* as viewed in the press direction. As such, in the implementation of FIG. 4, the edge of the first working surface 2*a* represents the edge of the overlap region R1. The insert plate 23 overlaps the entire overlap region R1. As viewed in the press direction, the area inside the middle line between the centroid G and edge of the overlap region R1 represents the inner region R1*u*, while the area outside the middle line represents the outer region R1*s*. In FIG. 4, the middle line between the centroid G and edge is indicated by a one-dot chain line AR. The middle line between the centroid G and edge of the overlap region R1 is represented by a set of middle points of line segments each connecting the centroid G with a given point on the edge.

In FIG. 4, line 2*a*R indicates the edge of the forming-surface region R2. In the forming-surface region R2, both the first and second working surfaces 2*a* and 3*a* are shaped to protrude or be recessed in the press direction.

Figure 5:
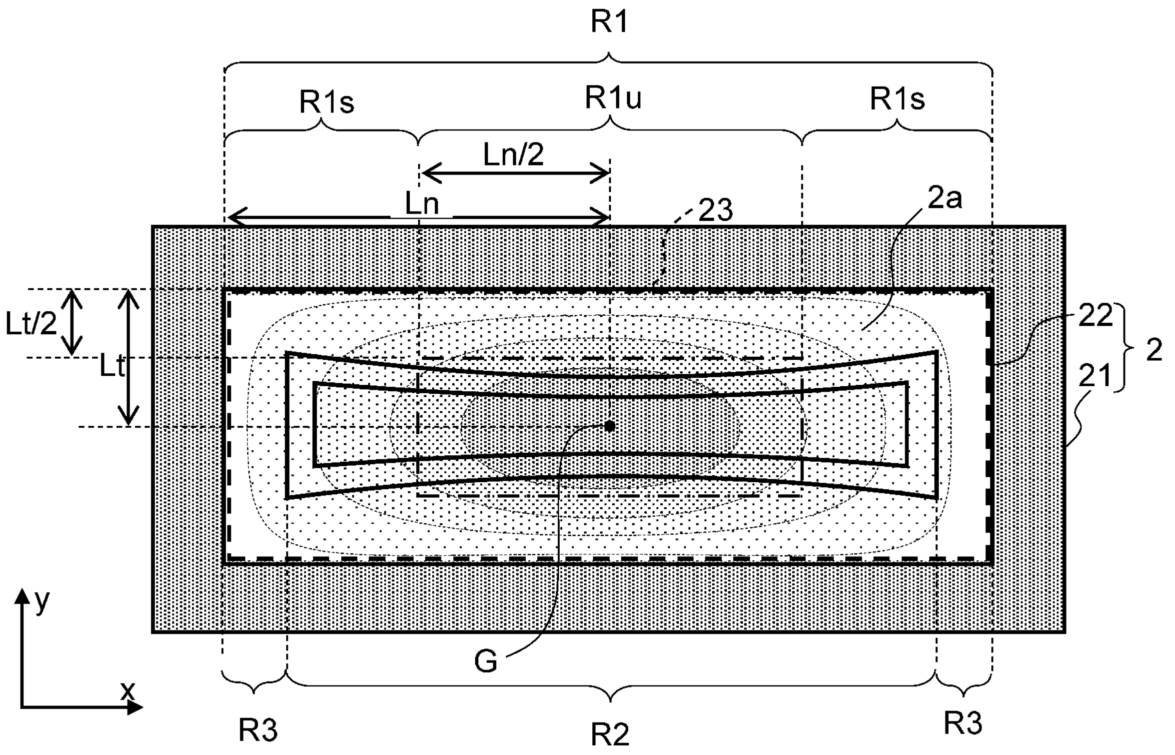
FIG. 5 shows a distribution of the dimension of the clearance for the first die part shown in FIG. 4 in the no-load condition.
Figure 6:
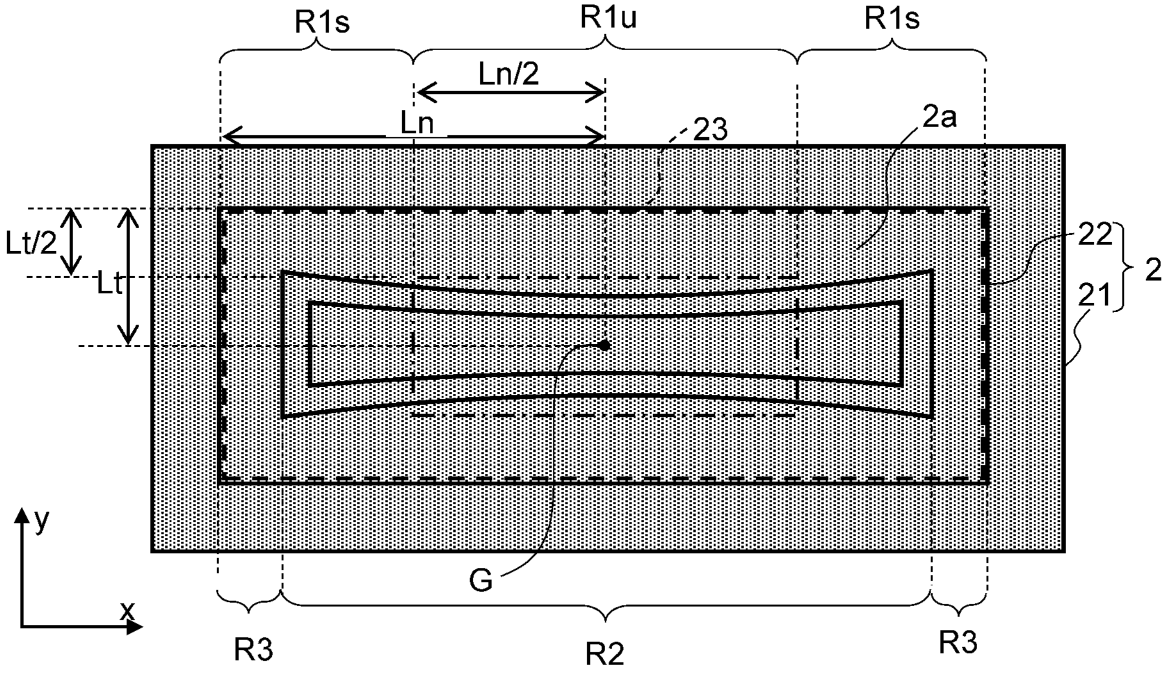
FIG. 6 shows a distribution of the dimension of the clearance for the first die part of FIG. 4 as found when the die is at the bottom-dead center.

FIG. 5 shows a distribution of the press-direction dimension of the clearance S1 for the first die part 2 shown in FIG. 4 in the no-load condition. FIG. 6 shows a distribution of the press-direction dimension of the clearances S1 as found when the die is at the bottom-dead center. In FIG. 5, a contour line indicating positions with the same press-direction dimension of the clearance S1 in the no-load condition is indicated by a dotted line. The contour lines are shown at a contour interval of 0.025 mm. In FIGS. 5 and 6, areas for different dimensions of the clearance S1 are hatched differently. Areas for smaller dimensions are indicated by thicker hatching. The area with the thickest hatching indicates that the press-direction dimension of the clearance S1 is 0 to 0.025 mm.

In the implementation shown in FIG. 5, as a whole, the clearance S1 formed by the insert plate 23 in the no-load condition is configured so as to be smaller in the inner region R1*u* than in the outer region R1*s*. As it goes outward from the centroid G, the clearance S1 increases. As a result, as examined along both the length and width directions of the overlap region R1, the minimum press-direction dimension of the clearance S1 in the inner region R1*u* is smaller than the minimum press-direction dimension of the clearance S1 in the outer region R1*s*. Thus, as the clearance S1 has a slope along both the length and width directions (i.e., two orthogonal directions as viewed in the press direction), deflections in the press apparatus can be absorbed efficiently. The length direction of the overlap region R1 is the direction with the longest dimension as viewed in the press direction. The width direction is the direction perpendicular to the length direction as viewed in the press direction. In FIGS. 4 to 6, the x-direction represents the length direction, while the y-direction represents the width direction.

In the implementation shown in FIG. 5, the press-direction dimension of the clearance S1 in the no-load condition is larger in the peripheral region R3 than in the forming-surface region 2. The minimum press-direction dimension of the clearance S1 in the forming-surface region R2 is smaller than the minimum press-direction dimension of the clearance S1 in the peripheral region R3 outside the forming-surface region R2. This configuration can be found both along the length and width directions of the overlap region. This allows the clearance S1 to efficiently absorb a deflection caused by the difference between a displacement of the forming-surface region of the press apparatus and a displacement of its surrounding region.

In the implementation shown in FIG. 6, when the die is at the bottom-dead center, the clearance S1 is 0 to 0.025 mm across the entire overlap region R1. That is, when the die is at the bottom-dead center, the clearance S1, both in the outer region R1*s* and inner region R1*u*, is smaller and is closer to uniform than it was in the no-load condition.

The shapes of the insert plates 23 and 33 determine the shapes of the clearances S1 and S2. The shapes of the clearances S1 and S2 can be changed by replacing the insert plates 23 and 33 with ones with different shapes. Changing the shapes of the clearances S1 and S2 will be easier in arrangements with insert plates 23 and 33 providing the clearances S1 and S2. In such implementations, for example, a trial-and-error approach may be used to achieve shapes of the clearances S1 and S2 that are more suitable for reducing deformation due to a deflection.

Figure 7:
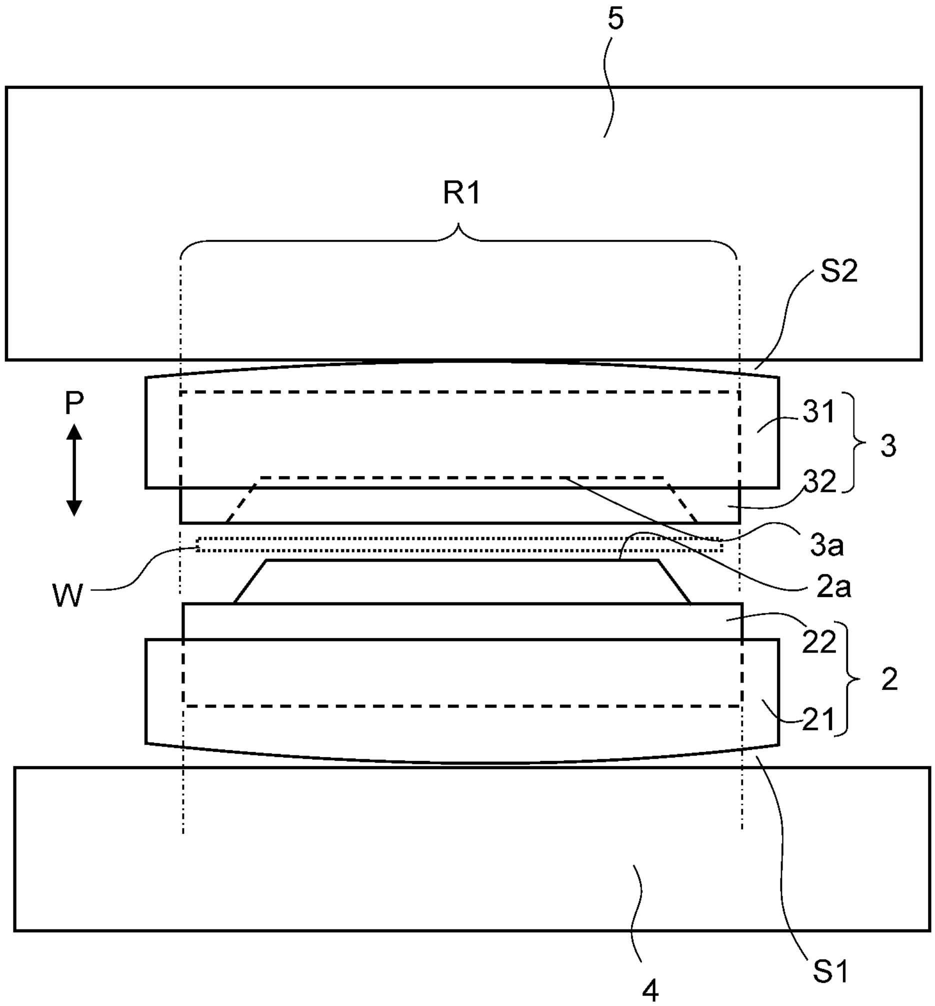
FIG. 7 shows another variation of the apparatus in terms of the configuration of the clearances for the die parts.

FIG. 7 shows another variation of the apparatus in terms of the configuration of the clearances S1 and S2 for the first and second die parts 2 and 3. In the implementation shown in FIG. 7, the clearance S1 is located between the first die part 2 and first support member 4. The clearance S2 is located between the second die part 3 and second support member 5. The clearance S1 is provided by a recess/protrusion on a surface of the first die part 2 that faces the first support member 4. The clearance S1 is a space between the surface of the first die part 2 that has the recess/protrusion and the first support member 4. The surface of the first support member 4 that faces the first die part 2 is a flat surface perpendicular to the press direction. The clearance S2 is provided by a recess/protrusion on a surface of the second die part 3 that faces the second support member 5. The clearance S2 is a space between the surface of the second die part 3 that has the recess/protrusion and the second support member 5. The surface of the second support member 5 that faces the second die part 3 is a flat surface perpendicular to the press direction.

The recess/protrusion on the surface of the first die part 2 facing the first support member 4 includes a portion in which the amount of protrusion in the press direction in the no-load condition is larger in the interior of the overlap region R1 overlapping the first and second working surfaces 2*a* and 3*a* as viewed in the press direction than at the edge of the overlap region. The recess/protrusion on the surface of the second die part 3 facing the second support member 5 includes a portion in which the amount of protrusion in the press direction in the no-load condition is larger in the interior of the overlap region R1 than at the edge of the overlap region. This will further reduce deformation of the first and second working surfaces 2*a* and 3*a* caused by deflections of the first and second support members 4 and 5.

Figure 8:
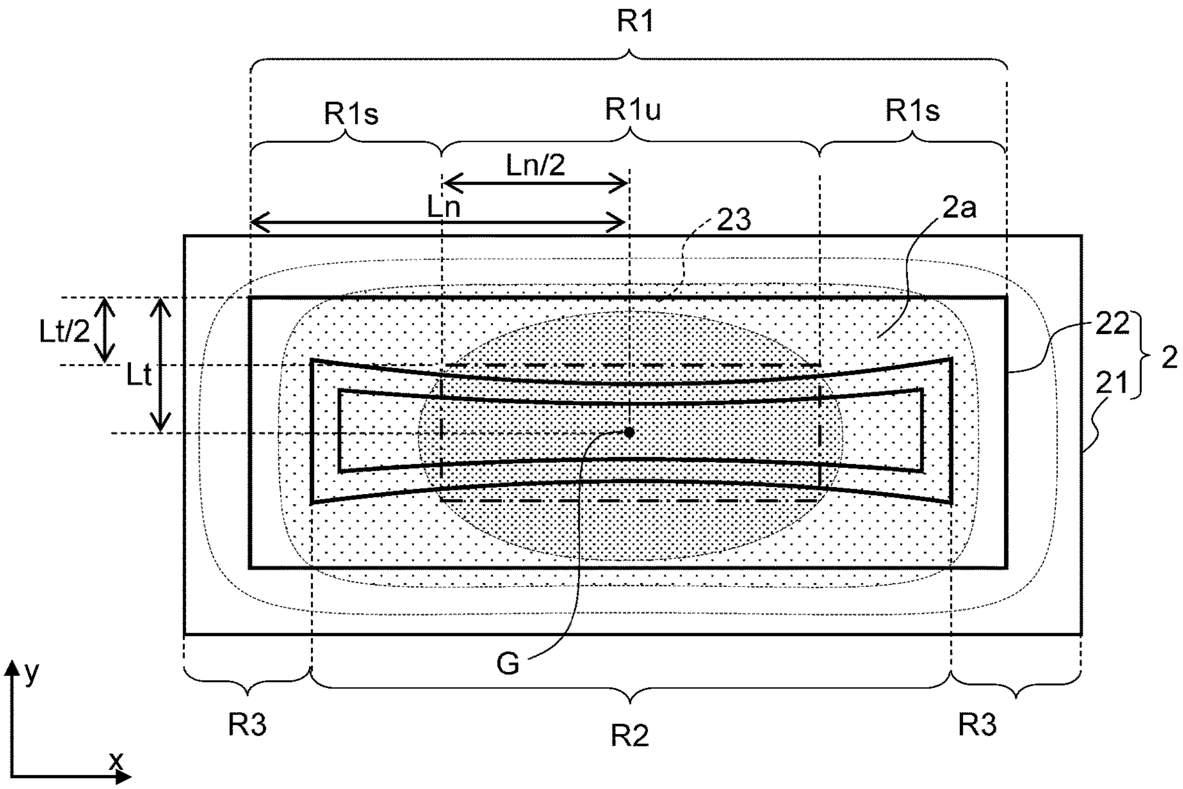
FIG. 8 shows a distribution of the dimension of the clearance for the first die part shown in FIG. 7 in the no-load condition.
Figure 9:
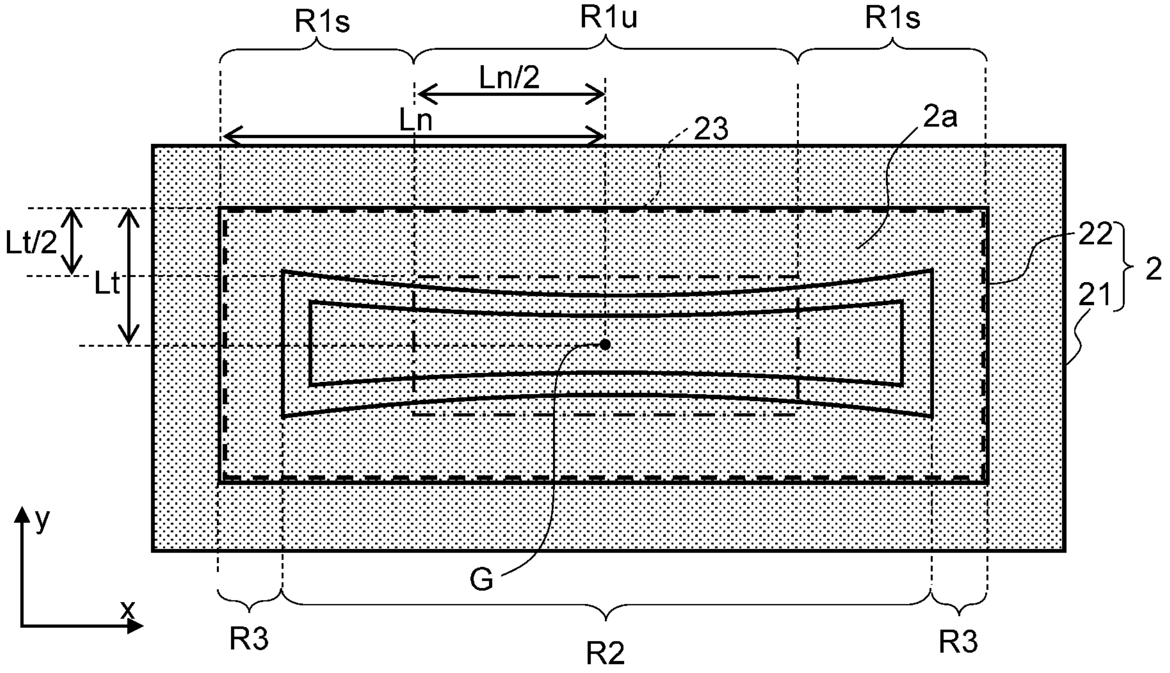
FIG. 9 shows a distribution of the dimension of the clearance for the first die part shown in FIG. 7 as found when the die is at the bottom-dead center.

FIG. 8 shows a distribution of the press-direction dimension of the clearance S1 for the first die part 2 shown in FIG. 7 in the no-load condition. FIG. 9 shows a distribution of the press-direction dimension of the clearance S as found when the die is at the bottom-dead center. In FIG. 8, the contour lines (i.e., dots) for the clearance S1 are drawn at a contour interval of 0.05 mm. In FIGS. 8 and 9, the area with the thickest hatching indicates that the press-direction dimension of the clearance S1 is 0 to 0.05 mm.

In the implementation shown in FIG. 8, the press-direction dimension of the clearance S1 is larger in the outer region R1*s* of the overlap region R1 than in the inner region R1*u*. Further, in the overlap region R1 and the region outside it, dimensions of the clearance S1 in outer regions are larger than dimensions in inner regions. That is, there is a tendency that the clearance S1 increases as it goes outward from the centroid G. The minimum dimension of the clearance S1 in the overlap region R1 is smaller than the minimum dimension of the clearance S1 in regions outside the overlap region R1. Thus, in regions for the first and second working surfaces 2*a* and 3*a* as well as in regions outside them, deflections in the press apparatus can be absorbed by the clearance S1.

Further, in the implementation shown in FIG. 8, the clearance S1 is larger in the peripheral region R3 than in the forming-surface region R2. The minimum press-direction dimension of the clearance S1 in the forming-surface region R2 is smaller than the minimum press-direction dimension of the clearance S1 in the peripheral region R3. The edge of the peripheral region R3 is represented by the edge of the base 21. In the peripheral region R3, too, there is a tendency that the clearance S1 decreases as it goes inward from the edge. This tendency can be found along both the length and width directions.

In the implementation shown in FIG. 9, when the die is at the bottom-dead center, the clearance S1 is 0 to 0.05 mm across the entire overlap region R1. That is, when the die is at the bottom-dead center, the clearance S1, both in the overlap region R1 and regions outside it, is smaller and is closer to uniform than in the no-load condition.

Figure 10:
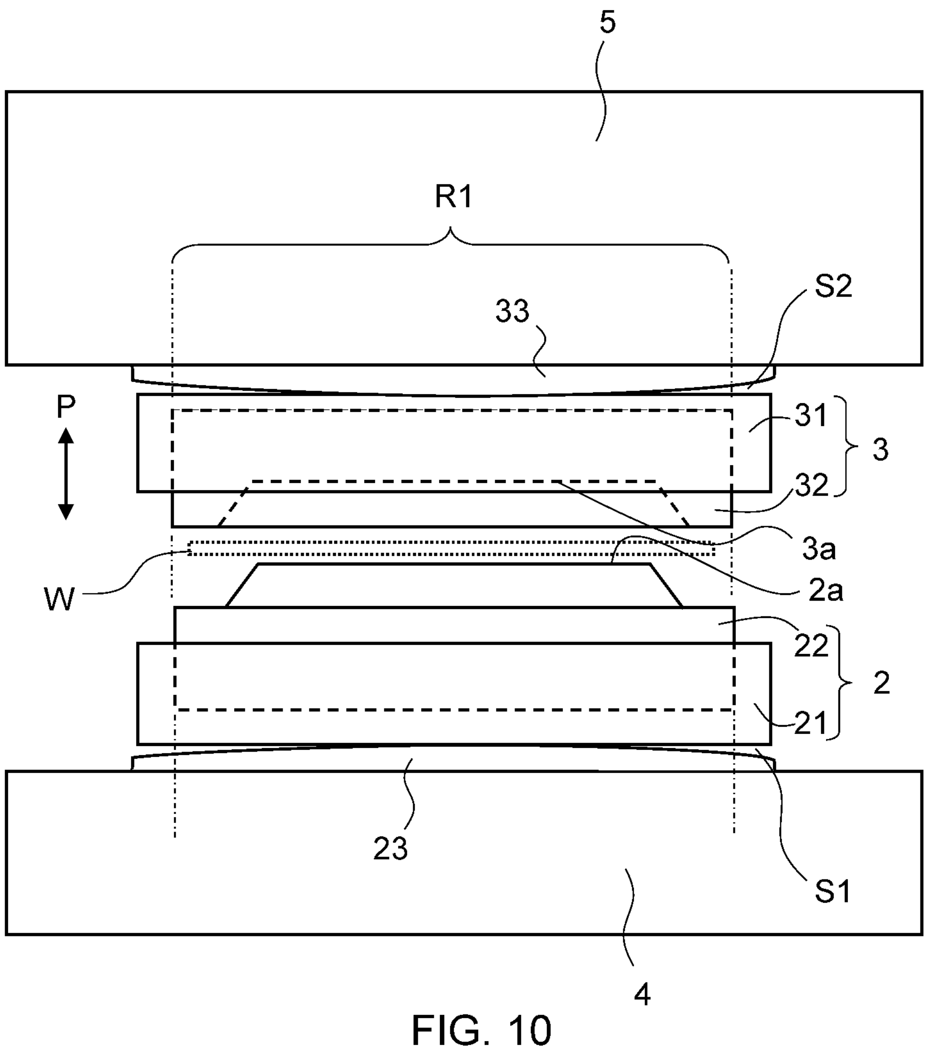
FIG. 10 shows yet another variation of the implementation shown in FIG. 7.

FIG. 10 shows yet another variation of the implementation shown in FIG. 7. In the implementation shown in FIG. 10, the clearance S1 is provided by the insert plate 23 inserted between the first die part 2 and first support member 4. That is, the clearance S1 is formed by the space between the insert plate 23 and first support member 4. The clearance S2 is provided by the insert plate 33 inserted between the second die part 3 and second support member 5. That is, the clearance S2 is formed by the space between the insert plate 33 and second support member 5.

For each of the insert plates 23 and 33, the thickness is largest at the center and decreases as it goes from the center toward the periphery. Each of the insert plates 23 and 33 has the shape of a convex lens. For each of the insert plates 23 and 33, one side in contact with a die part is a flat surface, while the other side, opposite to that one side, is a protruding curved surface. Thus, each of the insert plates 23 and 33 may include a portion in which the thickness at a position close to the edge of the overlap region R1 is smaller than the thickness at a position inside the overlap region R1 far from the edge. This will further reduce deformation of the first and second working surfaces 2*a* and 3*a* caused by deflections of the first and second support members 4 and 5.

(Analysis Results)

Press-forming simulations were performed using data representing models of various press apparatus to analytically determine the shape accuracy of the press-formed products. The analysis models used for the simulations were a model of a press apparatus constructed as shown in FIG. 3 including insert plates 23 and 33 and clearances S1 and S2 (Model 1), and a model of a press apparatus generally constructed as shown in FIG. 3 but including neither insert plates 23, 33 nor clearances S1, S2 (Model 2). In every one of Models 1 and 2, the frame 6, support members 4 and 5, and die parts 2 and 3 were elastic bodies capable of deforming elastically. Further, a simulation was conducted with a model having the same construction as Model 2 but including die parts 2 and 3 entirely constituted by rigid bodies (Model 3). From the simulations, the shapes of press-formed products were obtained. The shapes of the press-formed products from Models 1 and 2 were compared with the shape of the press-formed product from Model 3. Specifically, the difference in shape between each of the press-formed products from Models 1 and 2, on one hand, and the press-formed product from Model 3, on the other, was determined and converted to a numerical value to calculate precision-indicative difference.

The analyses shows that the precision-indicative difference of the press-formed product from Model 1, which has insert plates, is approximately a half of the precision-indicative difference of the press-formed product from Model 2, which has no insert plates. This shows that providing insert plates to form clearances in the no-load condition will improve the shape accuracy of the resulting press-formed product. Further, in the case of Model 1, deflections of the first and second working surfaces 2*a* and 3*a* of the die parts when the die is at the bottom-dead center during pressing is found to be smaller than in the case of Model 2. This shows that providing insert plates to form clearances in the no-load condition will reduce deflections of the working surfaces, thereby advantageously reducing decrease in the shape accuracy of the resulting press-formed product due to a deflection.

Embodiments of the present invention have been described. The press apparatus 1 according to the embodiments may be used as a press for press-forming a metal object, for example. By way of example, the press apparatus 1 may be used as a press for pressing an ultra-high-tensile strength (tensile strength: 780 MPa or higher) steel material (i.e., ultra-high-tensile strength steel sheet). In a press, defects in shape accuracy due to deformation of a working surface of a die part due to deflections of its support member tends to be particularly significant during press-forming of a high-tension material. Accordingly, the press apparatus 1 and manufacturing method according to the embodiments may be suitably used to press-form a high-tension steel material.

Although not limiting, the press apparatus according to an embodiment may be used as a press with a press load of 10 to 2000 tonf, for example. Particularly, the press apparatus according to an embodiment may be used as a press with a press load not lower than 100 tonf. In such implementations, the effects of a deflection on the dimension precision of a press-formed product of an ultra-high-tensile strength steel material will be reduced.

The present invention is not limited to the above-described embodiments. For example, although the insert plates 23 and 33 are plates with non-uniform thicknesses in the above implementations, the insert plates 23 and 33 may have a uniform thickness. In such implementations, for example, the overlap region R1 may include both locations where the insert plates 23 and 33 are present and locations where no insert plates are present. In such implementations, too, clearances S1 and S2 with non-uniform dimensions in the press direction may be provided in the overlap region R1.

Further, in the implementation shown in FIG. 1, the first support member 4 is fixed to the frame 6 and the second support member 5 is movable in the press direction relative to the frame 6; however, arrangements with the second support member 5 reciprocally movable in the press direction relative to the first support member 4 are not limited to the above-described one. For example, in one arrangement, the second support member 5 may be fixed to the frame 6 and the first support member 4 may be reciprocally movable relative to the frame. Alternatively, both the first and second support members 4 and 5 may be constructed to be reciprocally movable in the press direction relative to the frame 6.

In the implementation shown in FIG. 1, the first working surface 2*a* includes a protrusion protruding in the press direction and the second working surface 3*a* includes a recessed portion recessed in the press direction. That is, the first die part 2 is a punch and the second die part 2 is a die block. Conversely, the first die part 2 may be a die block and the second die part 3 may be a punch. Further, in addition to the first and second die parts, yet another die part may be provided. For example, in a press apparatus for drawing, a die part such as a blank holder may be provided in addition to the first and second die parts to serve as an auxiliary die part.

In the implementation shown in FIG. 1, every one of the first and second die parts 2 and 3 is composed of a plurality of parts, i.e., a working-surface part and a base. Alternatively, at least one of the first and second die parts 2 and 3 may be integrally constructed by a single part. In such implementations, a clearance is provided between a die part integrally constructed by a single part and a support member.

In the implementation shown in FIG. 1, one first die part is mounted on the first support member 4 while one second die part is mounted on the second support member. Alternatively, a plurality of first die parts may be mounted on the first support member 4 while a plurality of second die parts may be mounted on the second support member. In such implementations, for example, transfer-type press-forming can be performed, where, for each support member, one of a plurality of die parts is used to press-form an object being pressed, which is then transported to another die part and press-formed again.

In the implementation shown in FIG. 1, clearances S1 and S2 are provided for both the first and second die parts 2 and 3. In an alternative arrangement, a clearance may be provided for one of the first and second die parts 2 and 3 and no clearance may be provided for the other. In such implementations, the effect of reducing deformation of a die part due to a deflection of a support member can still be produced.

Although embodiments of the present invention have been described, the above-described embodiments are merely illustrative examples useful for carrying out the present invention. Thus, the present invention is not limited to the above-described embodiments, and the above-described embodiments, when carried out, may be modified as appropriate without departing from the spirit of the invention.

REFERENCE SIGNS LIST

1: press apparatus
2: first die part
3: second die part
4: first support member
5: second support member
21, 31: bases
22, 32: working-surface parts
23, 33: insert plates
S1, S2: clearances
W: object to be (being) pressed
R1: overlap region
R1*u*: inner region
R1*s*: outer region

The invention claimed is:

1. A press apparatus for press-forming an object being pressed, comprising:

a first die part having a first working surface contactable with one side of the object being pressed during press-forming;

a second die part having a second working surface contactable with another side of the object being pressed during press-forming;

a first support member adapted to support the first die part; and a second support member adapted to support the second die part and reciprocally movable relative to the first support member in a press direction, a frame; and slide drive units, wherein at least one of the first and second die parts provides a clearance present in at least a portion of an overlap region, the overlap region being overlapped by the first and second working surfaces as viewed in the press direction, a dimension of the clearance in the press direction in a no-load condition being non-uniform along two orthogonal directions as viewed in the press direction, and a minimum dimension of the clearance in the press direction within an inner region in the no-load condition is smaller than a minimum dimension of the clearance in the press direction within an outer region in the no-load condition, the inner region defined by, and located inward of, a middle line formed by a set of middle points of line segments each connecting a centroid of the overlap region with a given position on an edge of the overlap region, the outer region defined by, and located outward of, the middle line, the second support member being a slide or ram mounted so as to be caused by the slide drive units to reciprocate relative to the frame in the press direction, at least one of the first and second support members is configured to be deflected by a press load, the first support member being a bolster fixed to the frame, an amount of deformation of the clearance in the press direction when the die parts are at the bottom-dead center relative to the clearance in the overlap region in the no-load condition is larger than an amount of deformation of the first and second working surfaces in the press direction when the die parts are at the bottom-dead center relative to the first and second working surfaces in the no-load condition.

2. The press apparatus according to claim 1, wherein a minimum dimension of the clearance in the press direction in a forming-surface region is smaller than a minimum dimension of the clearance in the press direction in a peripheral region, the forming-surface region being a portion of the overlap region in which the first and second working surfaces contribute to displacement of the object being pressed in the press direction during press-forming, the peripheral region defined by, and located outward of, the forming-surface region.

3. The press apparatus according to claim 1, wherein at least one of the first and second die parts includes a portion configured such that the dimension of the clearance in the press direction in the no-load condition is smaller in an interior of the overlap region than at the edge of the overlap region as viewed in the press direction.

4. The press apparatus according to claim 1, wherein the clearance is provided by at least one of a recess/protrusion of a surface of the first die part facing the first support member or a recess/protrusion of a surface of the second die part facing the second support member.

5. The press apparatus according to claim 4, wherein at least one of the recess/protrusion of the surface of the first die part facing the first support member or the recess/protrusion of the surface of the second die part facing the second support member includes a portion configured such that an amount of the recess/protrusion in the press direction in the no-load condition is larger in an interior of the overlap region as viewed in the press direction than at the edge of the overlap region.

6. The press apparatus according to claim 1, wherein the clearance is provided by at least one of an insert plate inserted between the first die part and the first support member or an insert plate inserted between the second die part and the second support member.

7. The press apparatus according to claim 6, wherein the at least one of the insert plate inserted between the first die part and the first support member or the insert plate inserted between the second die part and the second support member includes a portion configured such that a thickness in the no-load condition is larger in an interior of the overlap region as viewed in the press direction than at the edge of the overlap region.

8. The press apparatus according to claim 1, wherein at least one of the first and second die parts includes a working-surface part including the first or second working surface and a base adapted to allow the working-surface part to be mounted thereon, the clearance is provided between the working-surface part and the base of the at least one of the first or second die part, and the clearance is provided by a recess/protrusion of a surface of the working-surface part facing the base or a surface of the base facing the working-surface part.

9. The press apparatus according to claim 8, wherein the recess/protrusion of the surface of the working-surface part facing the base or the surface of the base facing the workpiece-surface part includes a portion configured such tat an amount of the recess/protrusion in the press direction in the no-load condition is larger in an interior of the overlap region as viewed in the press direction than at the edge of the overlap region.

10. The press apparatus according to claim 1, wherein at least one of the first and second die parts includes a working-surface part including the first or second working surface and a base adapted to allow the working-surface part to be mounted thereon, and the clearance is provided by an insert plate inserted between the working-surface part and the base of at least one of the first or second die part.

11. The press apparatus according to claim 10, wherein the insert plate inserted between the working-surface part and the base includes a portion configured such that a thickness in the no-load condition is larger in an interior of the overlap region as viewed in the press direction than at the edge of the overlap region.

12. The press apparatus according to claim 1, wherein at least one of the first and second die parts includes a working-surface part including the first or second working surface and a base adapted to allow the working-surface part to be mounted thereon, the clearance is provided by an insert plate inserted between the working-surface part and the base of at least one of the first or second die part, the working-surface part is an insert die part, the base is an insert receptacle, the insert receptacle includes a recessed portion recessed in the press direction, and the insert die part is inserted into the recessed portion of the insert receptacle and fixed thereto.

13. A method of manufacturing a press-formed product using a press apparatus, comprising:

placing an object to be pressed between a first die part supported by a first support member of the press apparatus and a second die part supported by a second support member; and performing press-forming by effecting such relative movement in a press direction between the first support member and the second support member that the support members are closer to each other so that a first working surface of the first die part contacts one side of the object to be pressed and a second working surface of the second die part contacts another side of the object to be pressed, wherein the press apparatus comprises a frame and slide drive units, the first support member is a bolster fixed to the frame and the second support member is a slide or ram mounted such that the slide drive units cause the relative movement in the press direction, wherein at least one of the first and second die parts provides a clearance present in at least a portion of an overlap region, the overlap region being overlapped by the first and second working surfaces as viewed in the press direction, a dimension of the clearance in the press direction in a no-load condition being non-uniform along two orthogonal directions as viewed in the press direction, a minimum dimension of the clearance in the press direction within an inner region in the no-load condition is smaller than a minimum dimension of the clearance in the press direction within an outer region in the no-load condition, the inner region defined by, and located inward of, a middle line formed by a set of middle points of line segments such connecting a centroid of the overlap region with a given position on an edge of the overlap region, the outer region defined by, and located outward of, the middle line, and during the press-forming, at least one of the first support and second support deflects and at the bottom-dead center the dimension of the clearance in the press direction in at least a portion of the overlap region is closer to uniform than in the no-load condition, wherein an amount of deformation of the clearance in the press direction when the die parts are at the bottom-dead center relative to the clearance in the overlap region in the no-load condition is larger than an amount of deformation of the first and second working surfaces in the press direction when the die parts are at the bottom-dead center relative to the first and second working surfaces in the no-load condition.

14. The method of manufacturing the press-formed product using the press apparatus according to claim 13, wherein at least one of the first and second die parts includes a working-surface part including the first or second working surface and a base adapted to allow the working-surface part to be mounted thereon, the clearance is provided by an insert plate inserted between the working-surface part and the base of at least one of the first or second die part, the working-surface part is an insert die part, the base is an insert receptacle, the insert receptacle includes a recessed portion recessed in the press direction, and the insert die part is inserted into the recessed portion of the insert receptacle and fixed thereto.

* * * * *